(12) United States Patent  
Miyoshi

(10) Patent No.: US 7,059,459 B2  
(45) Date of Patent: Jun. 13, 2006

(54) MULTIPLE DISC CLUTCH APPARATUS

(75) Inventor: Tatsuro Miyoshi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/682,069

(22) Filed: Oct. 10, 2003

(65) Prior Publication Data

US 2004/0074731 A1   Apr. 22, 2004

(30) Foreign Application Priority Data

Oct. 11, 2002   (JP)   ............................ 2002-299142

(51) Int. Cl.
   *F16D 13/52*   (2006.01)
(52) U.S. Cl. .............. 192/70.12; 192/70.2; 192/113.31
(58) Field of Classification Search ............ 192/70.12, 192/70.14, 70.2, 107 R, 107 M, 113.31
   See application file for complete search history.

(56) References Cited

U.S. PATENT DOCUMENTS

| 4,878,563 | A | * | 11/1989 | Baden et al. ............... 188/71.5 |
| 5,176,236 | A |   | 1/1993  | Ghidorzi et al. ............ 192/107 |
| 5,452,784 | A | * | 9/1995  | Miyoshi et al. ......... 192/107 M |
| 5,535,870 | A | * | 7/1996  | Takezaki et al. ......... 192/70.14 |
| 5,671,835 | A | * | 9/1997  | Tanaka et al. ............ 192/107 R |
| 5,913,395 | A | * | 6/1999  | Takakura et al. ........ 192/70.12 |
| 5,975,267 | A | * | 11/1999 | Takakura et al. ........ 192/70.14 |

FOREIGN PATENT DOCUMENTS

JP   59-054825   3/1984

* cited by examiner

*Primary Examiner*—Saul Rodriguez  
(74) *Attorney, Agent, or Firm*—Miles & Stockbridge P.C.

(57) ABSTRACT

A multiple disc clutch apparatus, comprises a plurality of externally splined annular friction plates, to one side surface only of each externally splined annular friction plate being fixed a friction material, and each externally splined annular friction plate being formed with engagement teeth at an outer periphery, a plurality of internally splined annular friction plates, to one side surface only of each internally splined annular friction plate being fixed a friction material, and each internally splined annular friction plate being formed with engagement teeth at an inner periphery. The externally splined friction plate and the internally splined friction plate are alternately arranged in a direction in which the frictional materials are not overlapped each other. An annular externally splined separator plate provided with engagement teeth on the outer peripheral surface thereof is interposed between a frictional material bonding surface of the internally splined friction plate and the externally splined friction plate. An internally splined annular separator plate provided with engagement teeth on the inner peripheral surface thereof is interposed between a frictional material bonding surface of the externally splined friction plate and the internally splined friction plate.

15 Claims, 15 Drawing Sheets

MULTIPLE DISC CLUTCH APPARATUS

This application claims the benefit of Japanese Patent application No. 2002-299142 which is hereby incorporated by reference.

BACKGROUND OF THE INVENTION

1. Field of the Invention

The present invention relates to a multiple disc clutch apparatus which is used in an automatic transmission or the like, for a car, and particularly to the technology for facilitating the manufacture thereof or enhancing the cooling performance.

2. Related Background Art

Generally, an automatic transmission of a car is provided with a planetary transmission mechanism of three to five speeds, in addition to a torque converter serving as a fluid coupling, and effects transmission by properly fixing or releasing the constituent elements (a sun gear, a planetary gear, etc.) of the planetary transmission mechanism by means of a clutch or a brake. A clutch and a brake of a wet-type multiple disc type in which friction plates and separator plates are alternately provided, are employed as the clutch and the brake to be assembled in the automatic transmission, except in some band-type brakes. A pressure oil from a transmission control hydraulic circuit is used in pressure contact (frictional engagement) of the plates of the two types. Also, since a comparatively large torque capacity can be obtained with a small volume and a smooth connection can be easily performed in an automatic two-wheeled vehicle, a wet-type multiple disc clutch is used as a clutch for intermitting the driving force.

FIG. 15 is a longitudinally cross-sectional view of the essential part of a conventional wet-type multiple disc clutch. As shown in this drawing, in this wet-type multiple disc clutch 1, externally splined friction (brake) plates 21 are brought into spline-fitting with the inner peripheral surface of a clutch case 3 to be slidable while internally splined friction plates 41 are brought into spline-fitting with the outer peripheral surface of a hub 5 to be slidable. Frictional materials 55, 75 are bonded to frictional material bonding surfaces 53, 73 of the respective friction plates 23, 41. When an automatic transmission pressure oil is introduced into an oil chamber 13 of the clutch case 3, a piston 9 which is fitted in a cylinder 7 moves to the left in the drawing and the both friction plates 23, 41 are contacted with each other with pressure, so that the clutch case 3 and the hub 5 are connected together. In FIG. 15, referential numerals 63 and 83 denotes frictional surfaces of the friction plates 21, 41, respectively.

In the conventional wet-type multiple disc clutch 1, one of the surfaces of each of the friction plates 21, 41 becomes the frictional material bonding surface 53 or 73, and the other becomes the frictional surface 63 or 83. Because of this arrangement, various problems as described below will occur. For example, it is desirable that the frictional material bonding surfaces 53, 73 be comparatively rough so as to enhance the bonding strength with the frictional materials 55, 75. Meanwhile, it is desirable that the frictional surfaces 63, 83 be smooth so as to suppress friction of the frictional materials 55, 75 which are in slide contact therewith. However, of each of the friction plates 21 and 41, if one of the surfaces is processed to have a surface roughness different from that of the other, the processing process and the processing devices become inevitably complicated, which inevitably brings about an increase in the manufacturing cost and the equipment cost, and lowered mass productivity. When an adhesive for bonding the frictional materials 55, 75 adheres to the frictional surfaces 63, 83, there arises an undesirable possibility that the sliding contact of the frictional surfaces 68, 83 with the frictional materials 55, 75 can not be conducted smoothly. As a result, it becomes necessary to take such means or a special bonding step as preventing the adhesive from adhering to the frictional surfaces 63, 83.

On the other hand, when the wet-type multiple disc clutch 1 is coupled or engaged, the frictional material 75 of each internally splined friction plate 41 is brought into sliding contact with the frictional surface 63 of the corresponding externally splined friction plate 21 and the frictional material 55 of each externally splined friction plate 21 is brought into sliding contact with the corresponding frictional surface 83 of the internally splined friction plate 41, so that a temperature rise of the both friction plates 21, 41 is inevitable due to the frictional heat. This temperature rise often occurs locally since the frictional materials 55, 75 bonded to the frictional material bonding surfaces 53, 73 are heat insulating materials, so that thermal deformation such as scorch or warp is easily created on the both frictional plates 21, 41.

SUMMARY OF THE INVENTION

The present invention has been contrived taking the above circumstances into consideration, and an object thereof is to provide a multiple disc clutch apparatus which aims of easier manufacture and improved cooling performance.

In order to solve the above problems, according to a first aspect of the present invention, there is provided a multiple disc clutch apparatus, comprising a plurality of externally splined annular friction plates, to one side surface only of each externally splined annular friction plate being fixed a friction material, and each externally splined annular friction plate being formed with engagement teeth at an outer periphery, a plurality of internally splined annular friction plates, to one side surface only of each internally splined annular friction plate being fixed a friction material, and each internally splined annular friction plate being formed with engagement teeth at an inner periphery, said externally splined friction plate and said internally splined friction plate are alternately arranged in a direction in which the frictional materials are not overlapped each other. This clutch apparatus is characterized in that an annular externally splined separator plate which is provided with engagement teeth on the outer peripheral surface thereof is interposed between a frictional material bonding surface of said internally splined friction plate and said externally splined friction plate.

Also, according to a second aspect of the present invention, there is provided a multiple disc clutch apparatus, comprising a plurality of externally splined annular friction plates, to one side surface only of each externally splined annular friction plate being fixed a friction material, and each externally splined annular friction plate being formed with engagement teeth at an outer periphery, a plurality of internally splined annular friction plates, to one side surface only of each internally splined annular friction plate being fixed a friction material, and each internally splined annular friction plate being formed with engagement teeth at an inner periphery, said externally splined friction plate and said internally splined friction plate are alternately arranged in a direction in which the frictional materials are not overlapped each other. This clutch apparatus is characterized in that an internally splined annular separator plate which is provided with engagement teeth on the inner peripheral surface thereof is interposed between a frictional material bonding surface of said externally splined friction plate and said internally splined friction plate.

In the multiple disc clutch apparatus of the present invention, it is preferable that communication grooves for comminuting the inner periphery thereof with the outer periphery are formed on at least one of a surface of said externally splined friction plate facing said externally splined separator plate and a surface of said externally splined separator plate facing said externally splined friction plate.

In the multiple disc clutch apparatus of the present invention, it is preferable that communication grooves for comminuting the inner periphery thereof with the outer periphery are formed on at least one of a surface of said internally splined friction plate facing said internally splined separator plate and a surface of said internally splined separator plate facing said internally splined friction plate.

Also, according to the present invention, there is provided a multiple disc clutch apparatus, wherein said communication grooves are formed radially from said inner periphery to said outer periphery.

In the multiple disc clutch apparatus of the present invention, it is preferable that said communication grooves are formed in a net structure.

In the multiple disc clutch apparatus of the present invention, it is preferable that said communication grooves comprise an annular groove formed between said inner periphery and said outer periphery, first slanting grooves for communicating said inner periphery with said annular groove and second slanting grooves for communication said annular groove with said outer periphery.

According to the present invention, smooth sliding contact between the separator plates and the frictional materials can be realized while the bonding strength between the friction plates and the bonding materials can be enhanced by giving different surface roughnesses to the friction plates and the separator plates. Also, in a clutch apparatus in which communication grooves are formed on the friction plates or the separator plates, a temperature rise of the friction plates or the separator plates is suppressed by distributing the automatic transmission oil, or the like, to the communication grooves.

DETAILED DESCRIPTION OF THE PREFERRED EMBODIMENTS

Figure 1:
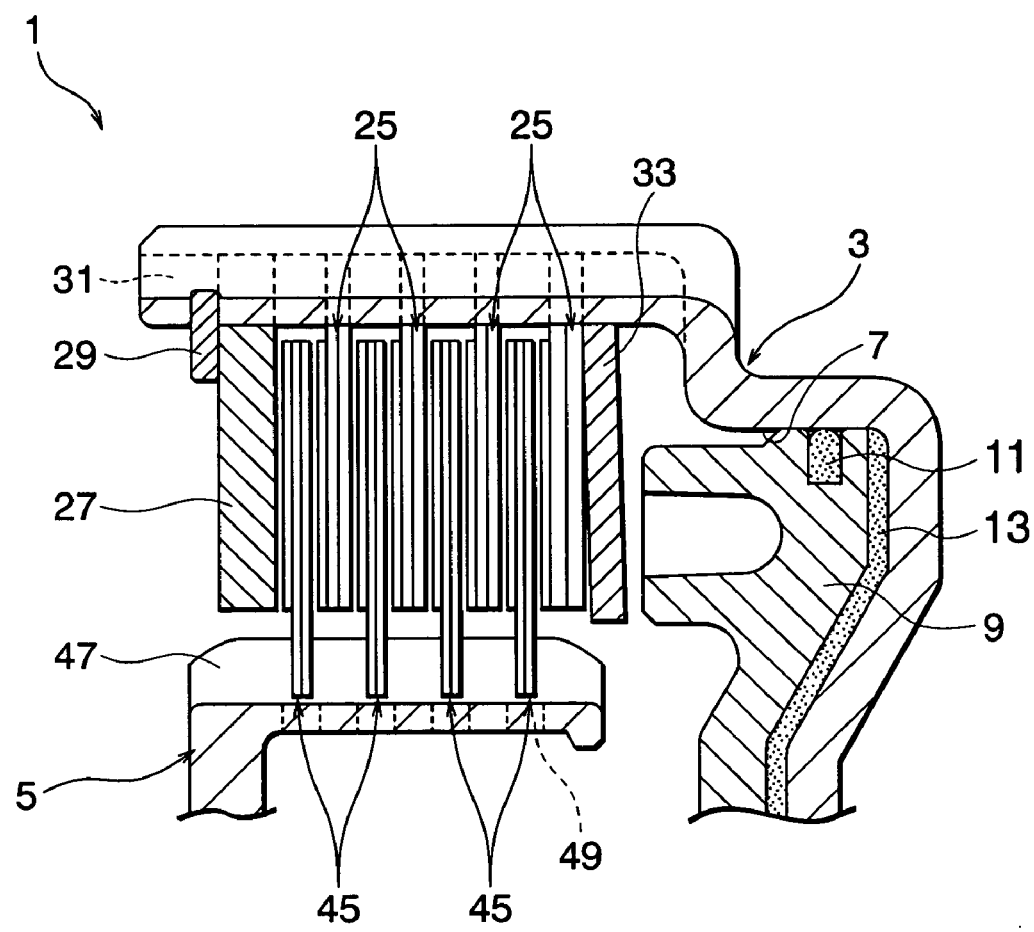
FIG. 1 is a longitudinally cross-sectional view of the essential part of a wet-type multiple disc clutch according to a first embodiment of the present invention.
Figure 2:
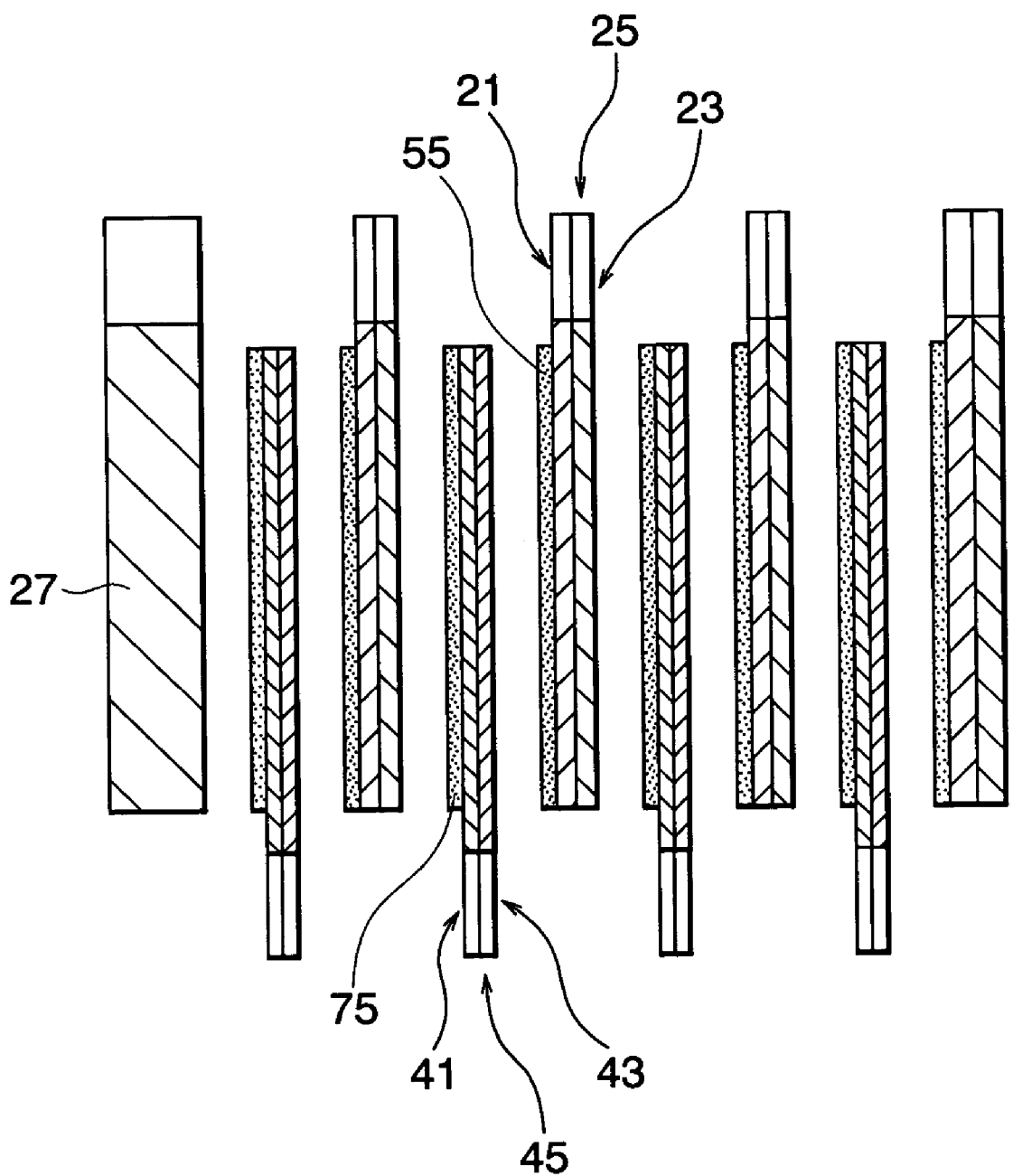
FIG. 2 is a structural view of frictional engagement elements in the first embodiment.

An embodiment in which the present invention is applied to a wet-type multiple disc clutch for an automatic transmission will be specifically described below with reference to drawings. FIG. 1 is a longitudinally cross-sectional view of the essential part of the wet-type multiple disc clutch according to the first embodiment of the present invention, while FIG. 2 is a structural view of frictional engagement elements. As shown in these drawings, a wet-type multiple disc clutch 1 is provided with a cylindrical clutch case 3 which is connected to an input shaft or the like, a hub 5 which is connected to a constituent element of a planetary transmission mechanism, and the like, and a piston 9 which is slidably fitted in a cylinder 7 formed on the tip end side (on the right side in FIG. 1) of the clutch case 3. An O-ring 11 is provided between the cylinder 7 and the piston 9 to seal the both members, and a pressure oil supplied from an unrepresented transmission control hydraulic circuit is introduced into an oil chamber 13 which is formed between the clutch case 3 and the piston 9.

On the clutch case 3, there are retained plural sets (four sets in the illustrated example) of externally splined engagement elements 25, each having one externally splined friction plate 21 and one externally splined separator plate 23, and one backing plate 27 to be slidable. These externally splined engagement elements 25 and the backing plate 27 are prevented from being removed by a snap ring 29 which is provided on the clutch case 3. A female spline 31 is formed on the inner peripheral surface of the clutch case 3, and a coned disc spring 33 is interposed between the piston 9 and the externally splined engagement elements 25.

On the other hand, on the hub 5, there are retained plural sets (four sets in the illustrated example) of internally splined engagement elements 45, each having one internally splined friction plate 41 and one internally splined separator plate 43, to be slidable. In FIG. 1, a male spline 47 is formed on the outer peripheral surface of the hub 5. There are also formed oil supply holes 45 for communicating the inner surface of the hub 5 with the outer surface.

Figure 3:
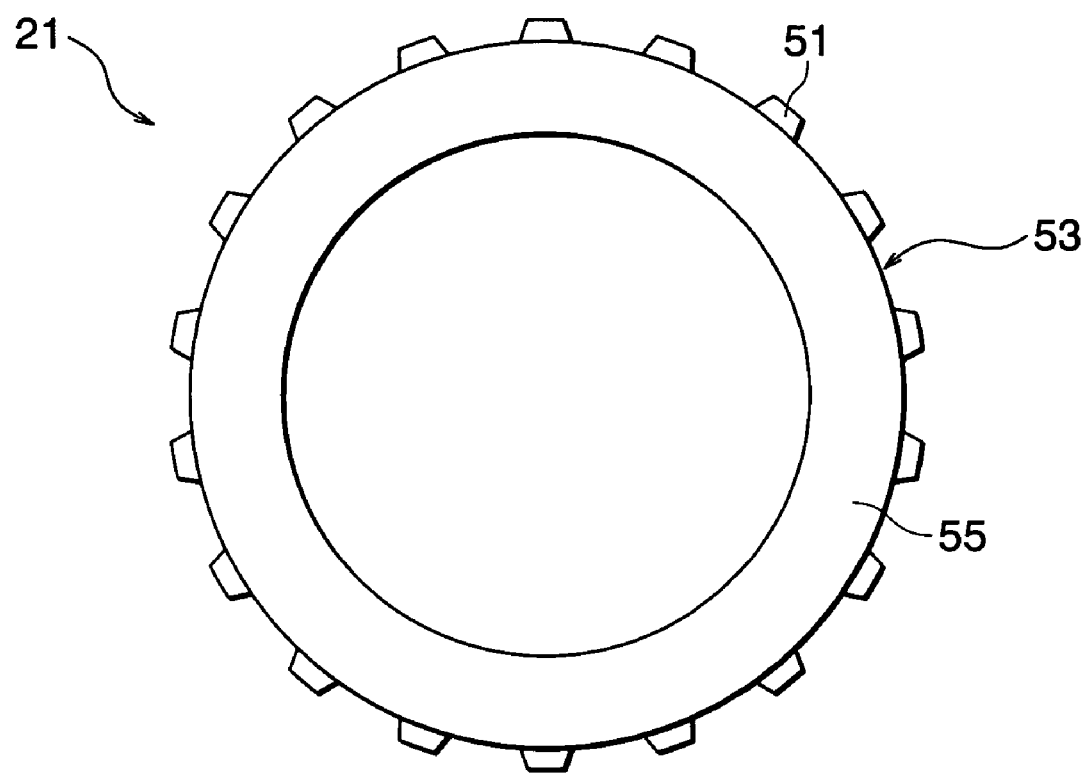
FIG. 3 is a view for showing a frictional material bonding surface of an externally splined friction plate according to the first embodiment.
Figure 4:
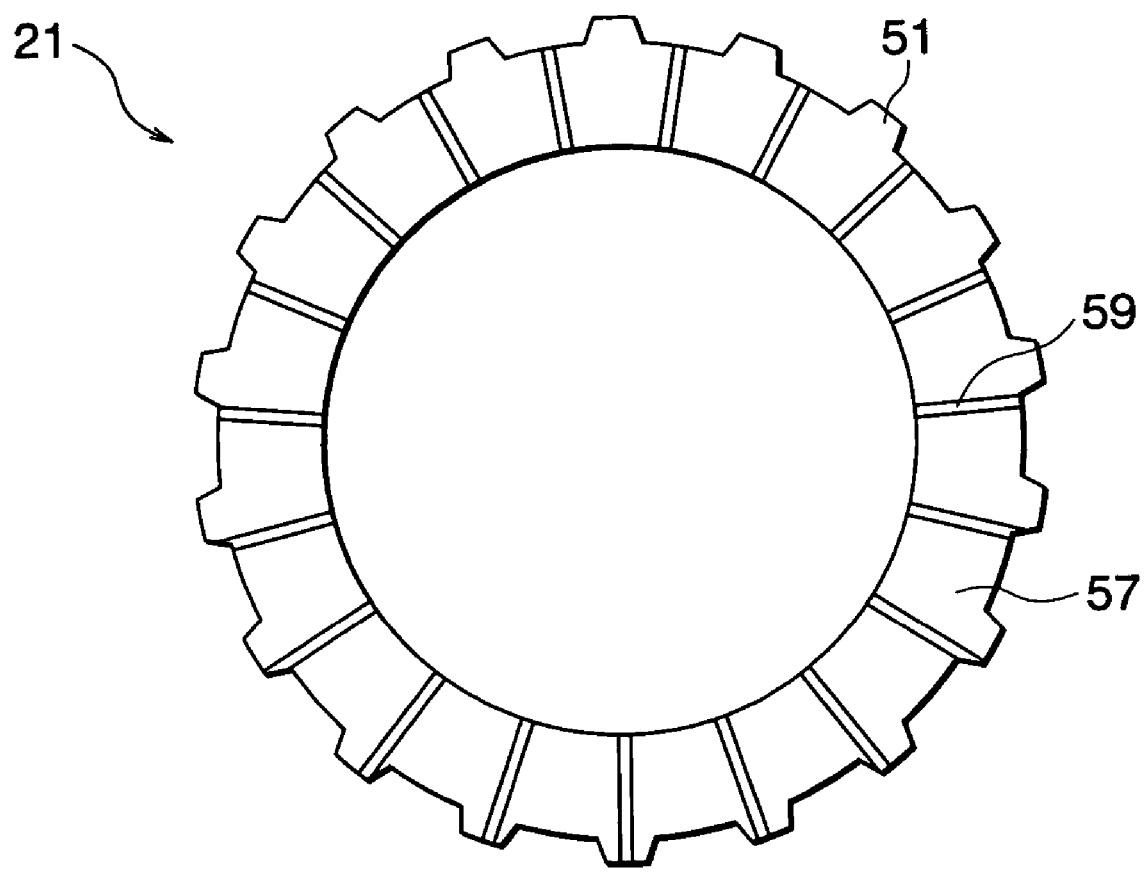
FIG. 4 is a view for showing a facing surface of the externally splined friction plate according to the first embodiment.

FIG. 3 is a view for showing a frictional material bonding surface 53 of the externally splined friction plate 21, and FIG. 4 is a view for showing a surface of the externally splined friction plate 21 facing the externally splined separator plate 23 (hereinafter simply called the facing surface). As shown in these drawings, the externally splined friction plate 21 is formed on the outer peripheral side thereof with a male spline 51 which is to be engaged with the female spline 31 of the clutch case 3, and an annular frictional material 55 is bonded to the frictional material bonding surface 53. Communication grooves 59 for communicating the inner periphery with the outer periphery are radially formed on the facing surface 57 of the friction plate 21. Note that the externally splined friction plate 21 is formed of a steel plate by pressing and then is subjected to pickling and barreling to have a finely uneven surface, which is suitable for bonding.

Figure 5:
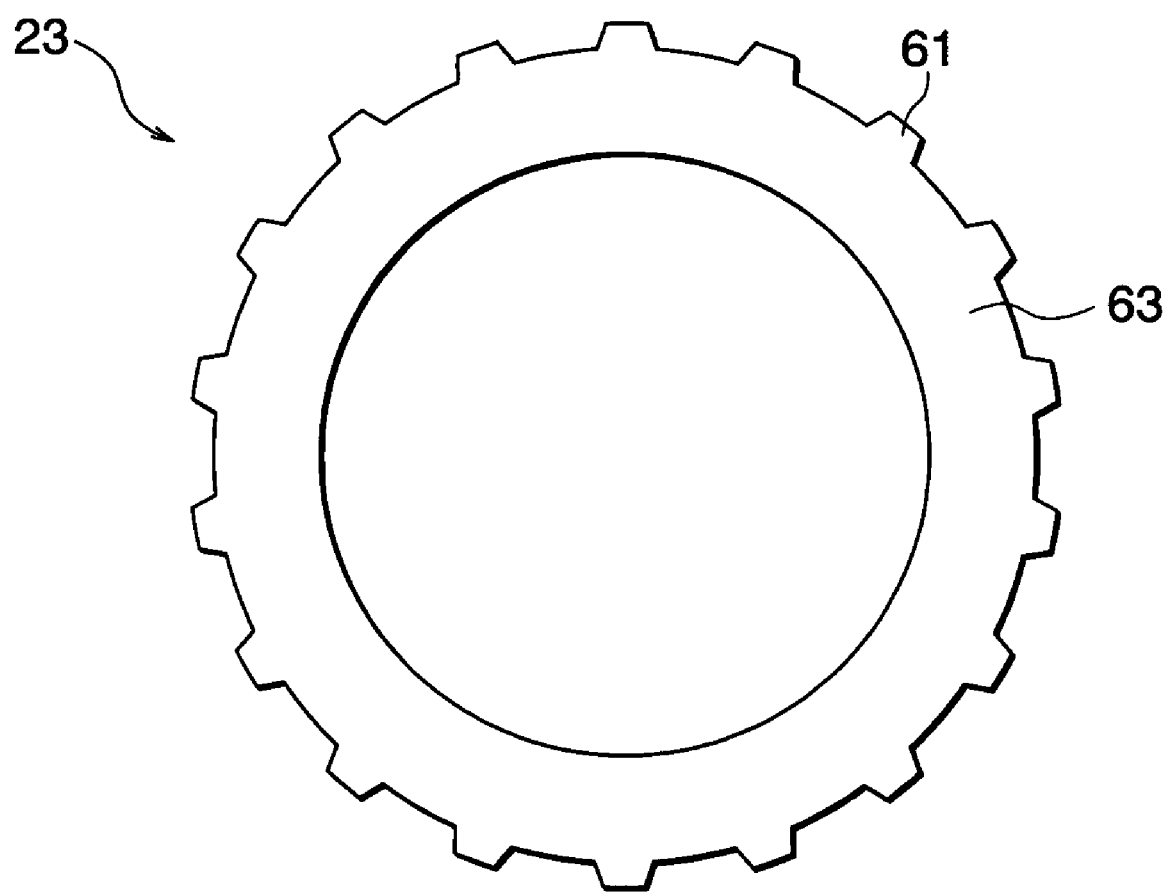
FIG. 5 is a view for showing a frictional surface of an externally splined separator plate according to the first embodiment.
Figure 6:
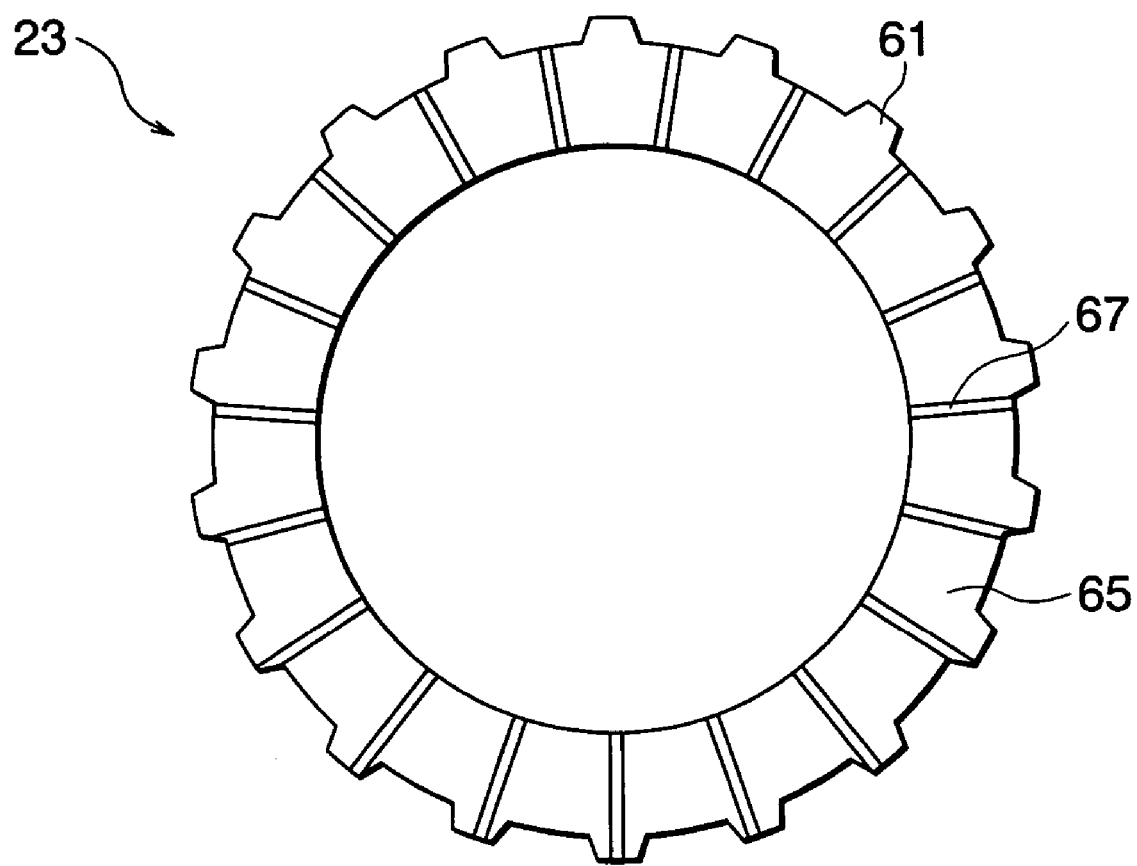
FIG. 6 is a view for showing a facing surface of an externally splined separator plate according to the first embodiment.

FIG. 5 is a view for showing a frictional surface of the externally splined separator plate 23, and FIG. 6 is a view for showing a facing surface of the externally splined separator plate 23 facing the externally splined friction plate 21 (hereinafter simply called the facing surface). As shown in these drawings, the externally splined separator plate 23 is formed at the outer peripheral side thereof with a male spline 61 which is engaged with the female spline 31 of the clutch case 3. In addition, a frictional surface 63 is formed to be smooth, and the facing surface 65 is formed with communication grooves 67, in the same manner as the externally splined friction plate 21.

Figure 7:
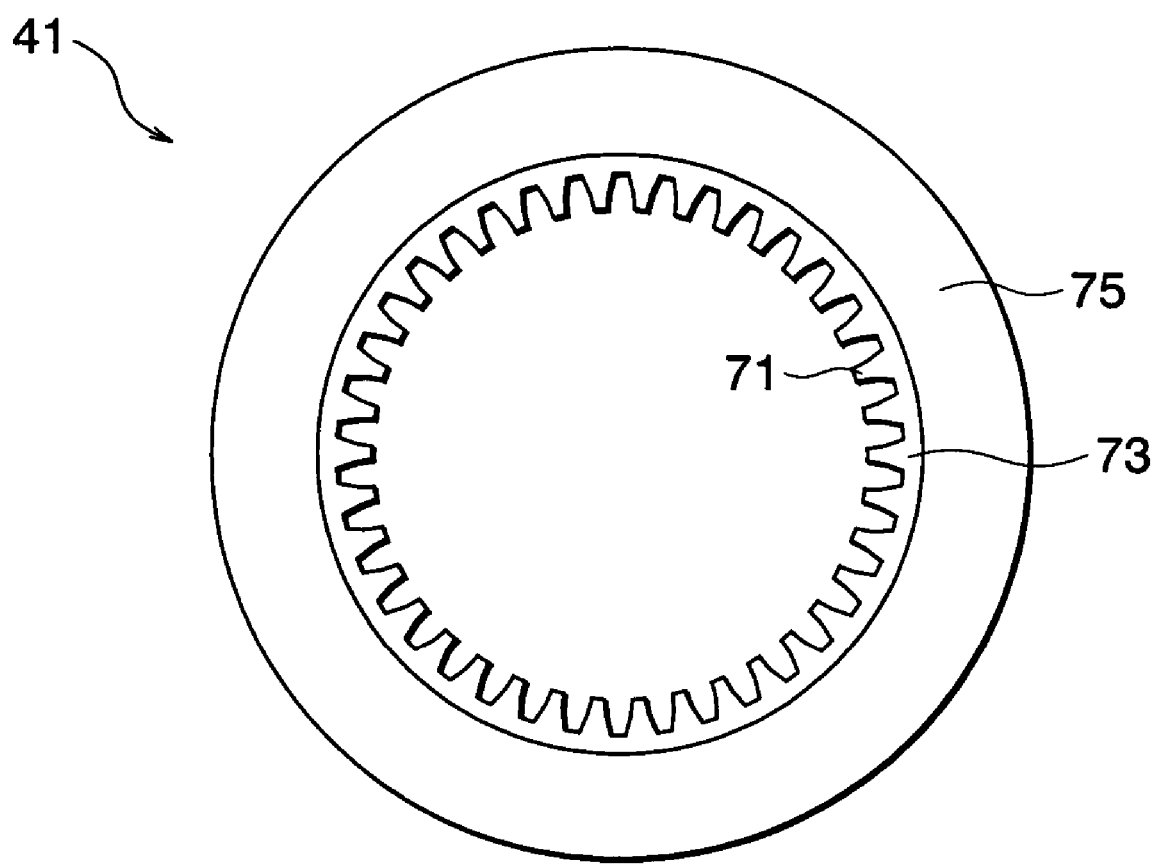
FIG. 7 is a view for showing a frictional material bonding surface of an internally splined friction plate according to the first embodiment.
Figure 8:
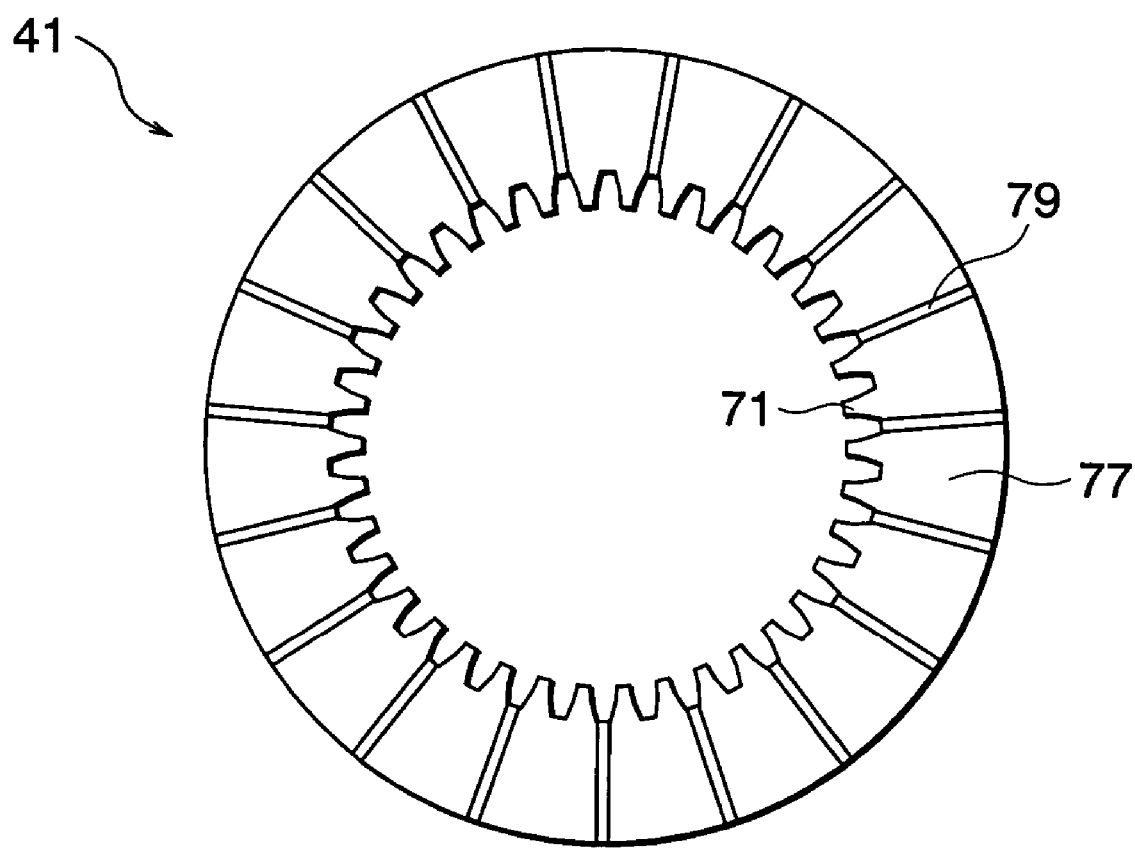
FIG. 8 is a view for showing a facing surface of the internally splined friction plate according to the first embodiment.

FIG. 7 is a view for showing a frictional material bonding surface 73 of the internally splined friction plate 41, and FIG. 8 is a view for showing a facing surface of the internally splined friction plate 41 facing the internally splined separator plate 43 (hereinafter simply called the facing surface). As shown in these drawings, the internally splined friction plate 41 is formed on the inner peripheral side thereof with a female spline 71 which is to be engaged with the male spline 47 of the hub 5. In addition, an annular frictional material 75 is bonded to the frictional material bonding surface 73, and communication grooves 79 are radially formed on the facing surface 77 of the friction plate 41 for communicating the inner periphery with the outer periphery thereof. Note that the internally splined friction plate 41 is formed of a steel plate by pressing and then is subjected to pickling and barreling to have a finely uneven surface, which is suitable for bonding.

Figure 9:
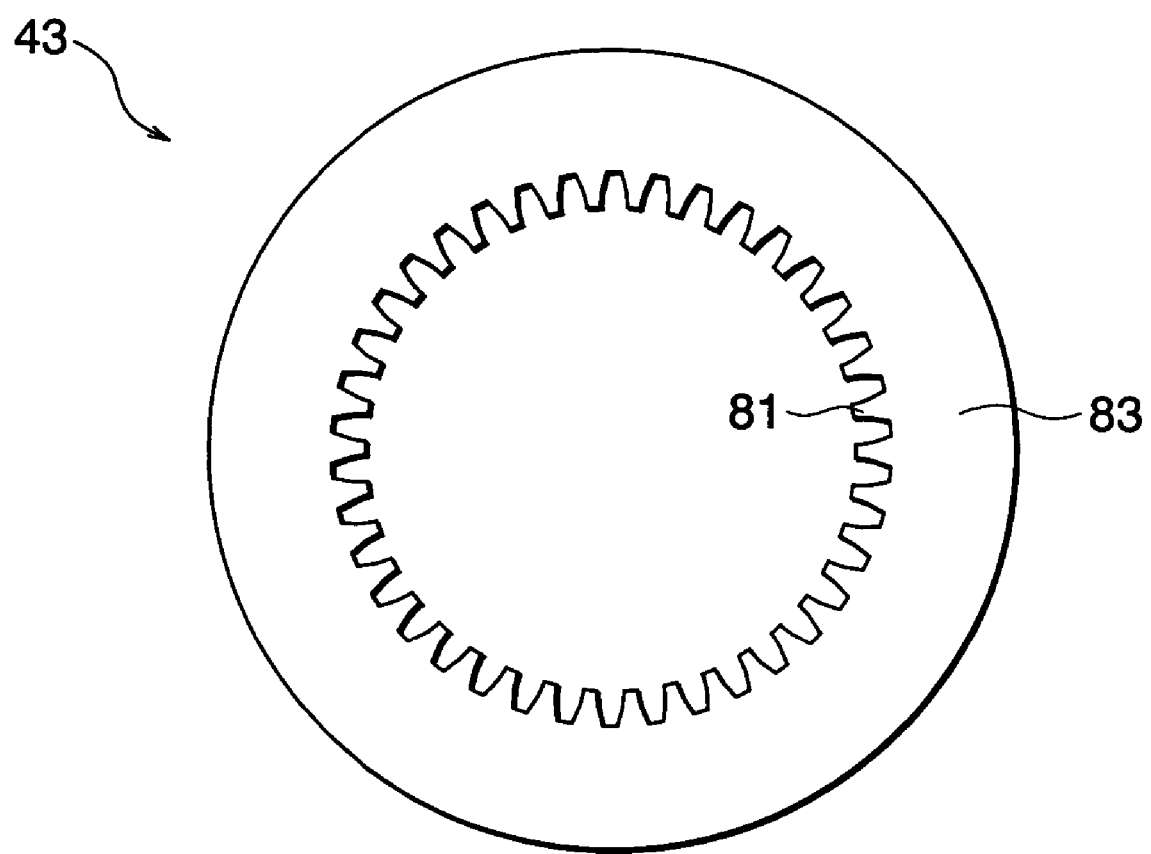
FIG. 9 is a view for showing a frictional surface of an internally splined separator plate according to the first embodiment.
Figure 10:
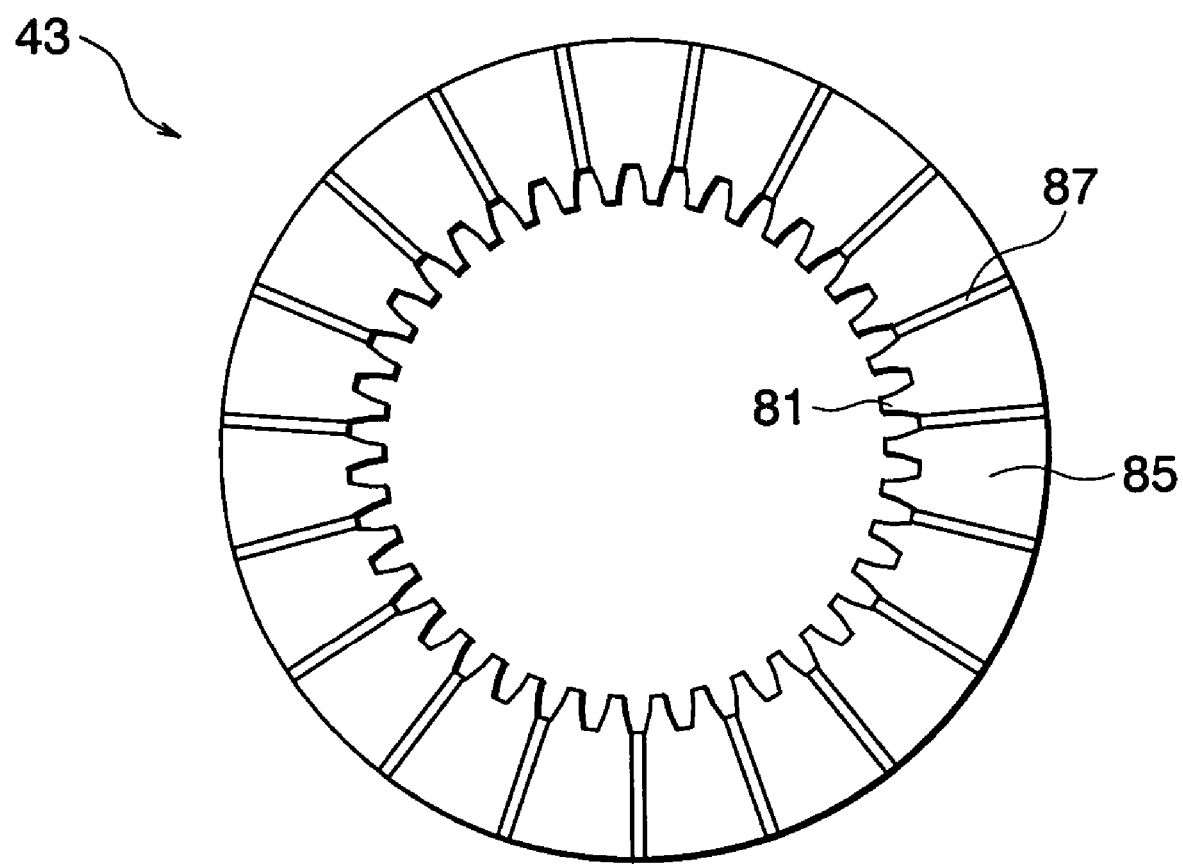
FIG. 10 is a view for showing a facing surface of the internally splined separator plate according to the first embodiment.

FIG. 9 is a view for showing a frictional surface 83 of the internally splined separator plate 43, and FIG. 10 is a view for showing a facing surface 85 of the internally splined separator plate 43 facing the internally splined friction plate 41 (hereinafter simply called the facing surface). As shown in these drawings, the internally splined separator plate 43 is formed on the inner peripheral side thereof with a female spline 81 which is engaged with the male spline 47 of the hub 5. In addition, the frictional surface 83 is formed to be smooth, and the facing surface 85 is provided with communication grooves 87, in the same manner as the internally splined friction plate 41.

A mode of operation according to the first embodiment will be described below.

When a gearshift is requested because of a change in the running condition, or the like, of the car and the clutch case 3 and the hub 5, which have been separated from each other, are to be connected or coupled together, the pressure oil supplied from the transmission control hydraulic circuit is supplied to the oil chamber 13 of the wet-type multiple disc clutch 1. Then, inside the cylinder 7, the piston 9 is moved at a predetermined speed to the left in FIG. 1, so that the respectively paired externally splined engagement elements 25 and the respectively paired internally splined engagement elements 45 are urged by the piston 9 to be brought into mutual pressure contact and then into frictional engagement. With this arrangement, the clutch case 3 which is in spline-fitting with the respectively paired externally splined engagement elements 25 and the hub 5 which is in spline-fitting with the respectively paired internally splined engagement elements 45 are rotated together as one body so as to fix or release the constituent elements of the unrepresented planetary transmission mechanism, thereby realizing the gearshift.

In this case, according to the first embodiment, since the externally splined friction plates 21 and the internally splined friction plates 41 are formed to have finely uneven or rough surfaces, the bonding strength thereof with the frictional materials 55, 75 becomes very high, so that peeling-off or removal of the frictional materials hardly occur in a long-term use. Even if little amounts of the adhesives are caused to adhere to the facing surfaces 57, 77 of the externally and internally splined friction plates 21, 41 when the frictional materials 55 and 75 are bonded to the externally splined friction plate 21 and the internally splined friction plate 41, the performance of the apparatus hardly declines, so as to simplify the bonding step or to enhance the efficiency of this step. Also, since the externally splined separator plates 23 and the internally splined separator plates 43 are so processed to have smooth surfaces that abrasion of the frictional materials 55, 75 in sliding contact therewith hardly advances.

On the other hand, when the externally splined engagement elements 25 and the internally splined engagement elements 45 are rotated, the automatic transmission oil supplied to the hub 5 through the oil supply holes 49 is caused to flow out to the clutch case 3 side via the communication grooves 59, 67, 79, 87 formed on the both friction plates 21, 41 and the both separator plates 23, 43 by the action of centrifugal force. With this operation, the heat which is generated due to the sliding contact between the respectively paired externally splined engagement elements 25 and the respectively paired internally splined engagement elements 45 is released effectively from the both engagement elements 25 and 45, so as to prevent thermal deformation such as a scorch or a warp caused by a temperature rise on the both friction plates 21, 41 and the both separator plates 23, 43.

Figure 11:
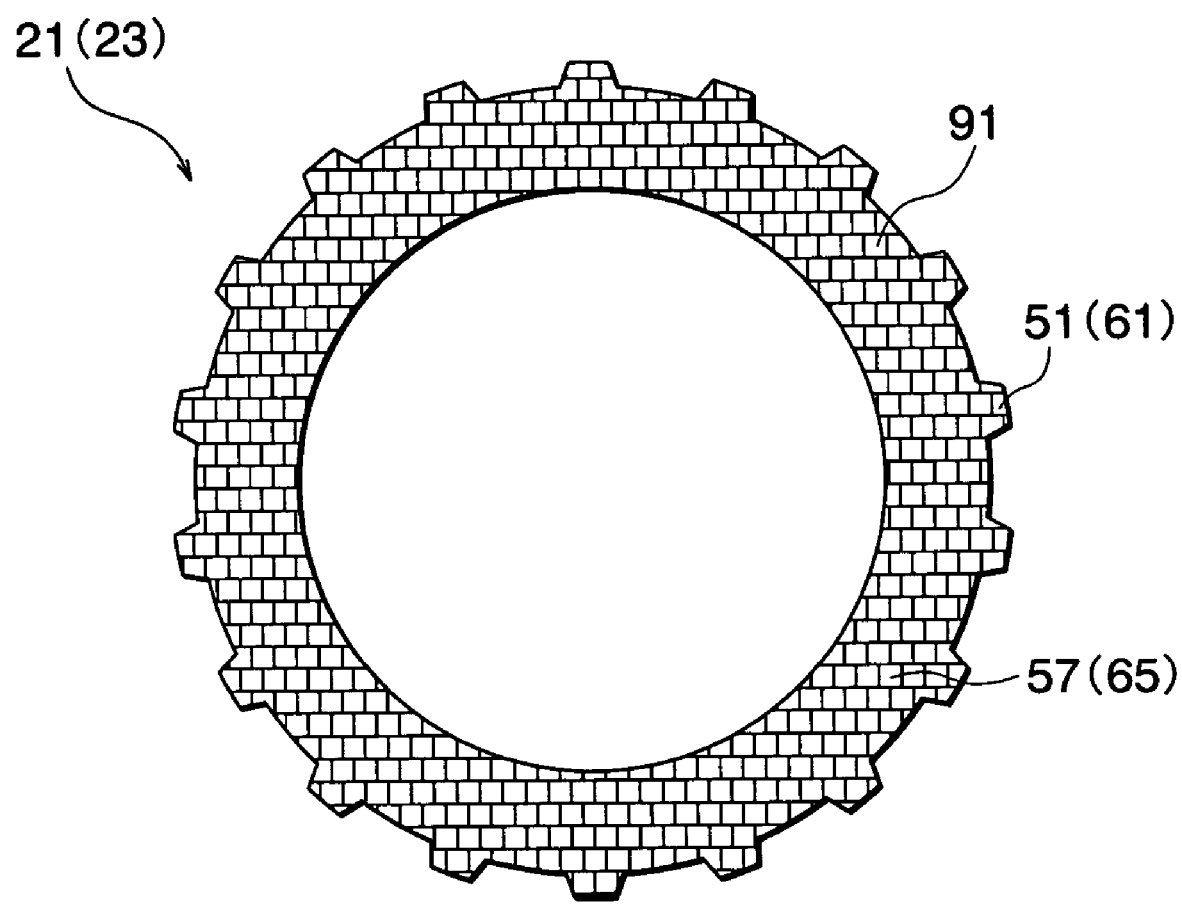
FIG. 11 is a view for showing facing surfaces of the externally splined friction plate and the externally splined separator plate according to a second embodiment of the present invention.
Figure 12:
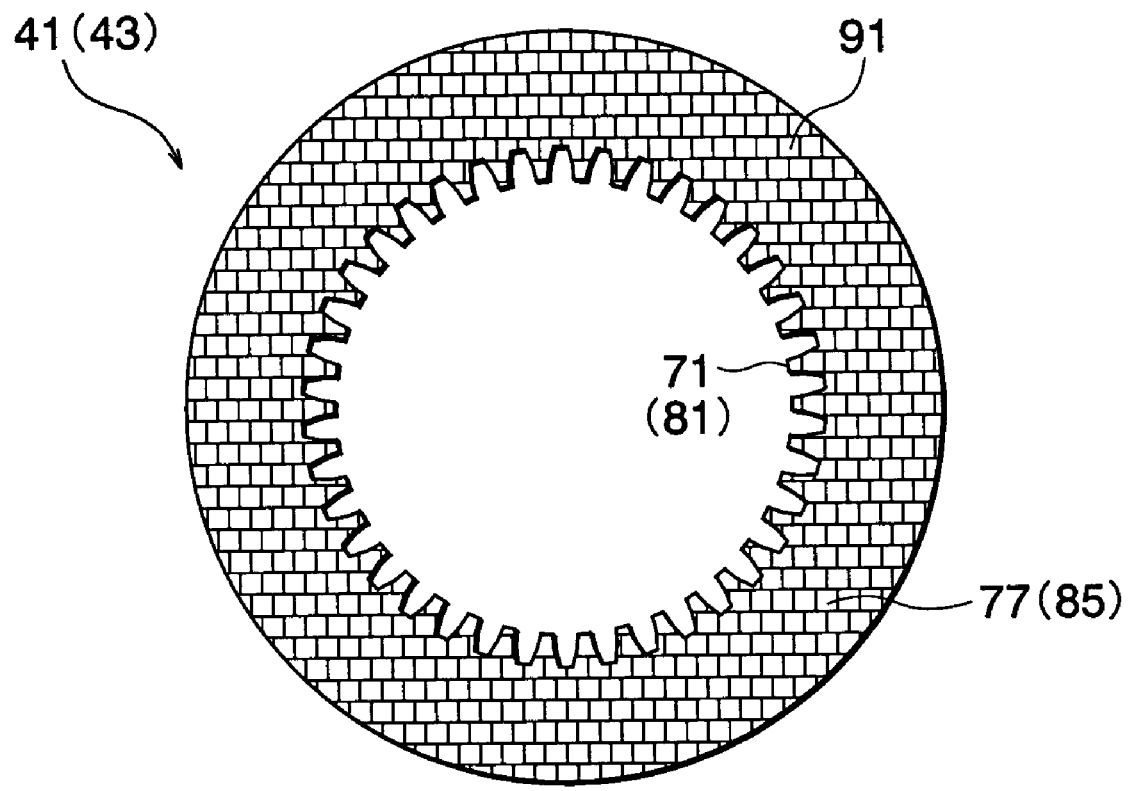
FIG. 12 is a view for showing facing surfaces of the internally splined friction plate and the internally splined separator plate according to the second embodiment.

FIG. 11 is a view for showing the facing surfaces of the externally splined friction plate and the externally splined separator plate according to the second embodiment, and FIG. 12 is a view for showing the facing surfaces of the internally splined friction plate and the internally splined separator plate according to the second embodiment. As shown in these drawings, according to the second embodiment, oil grooves 91 in a net structure are formed on the facing surfaces 57, 65 of the externally splined friction plate 21 and the externally splined separator plate 23, and on the facing surfaces 77, 85 of the internally splined friction plate 41 and the internally splined separator plate 43. By employing such a structure, the automatic transmission oil can be supplied to the entire areas of the facing surfaces 57, 65, 77 and 85 so that no distortion is concentrated in any part at the time of the engagement, whereby a local temperature rise or abrasion can be prevented.

Figure 13:
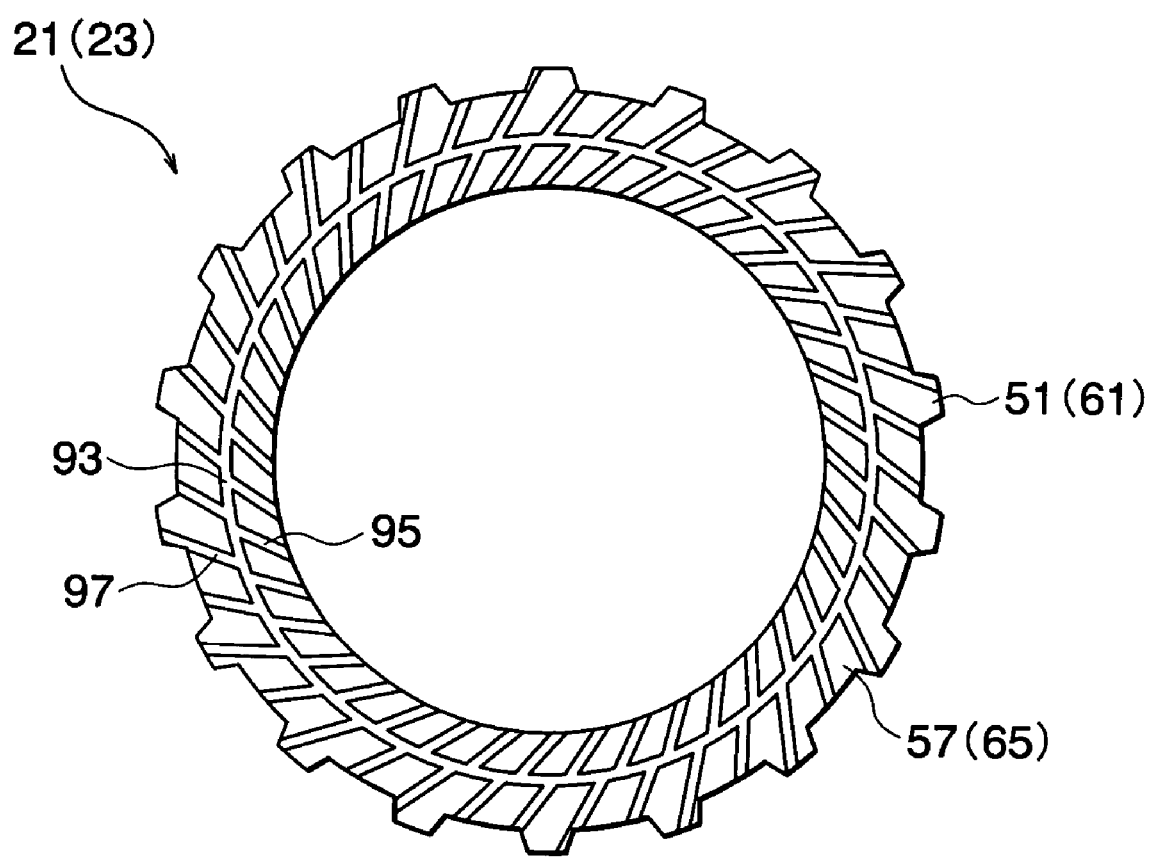
FIG. 13 is a view for showing facing surfaces of the externally splined friction plate and the externally splined separator plate according to a third embodiment of the present invention.
Figure 14:
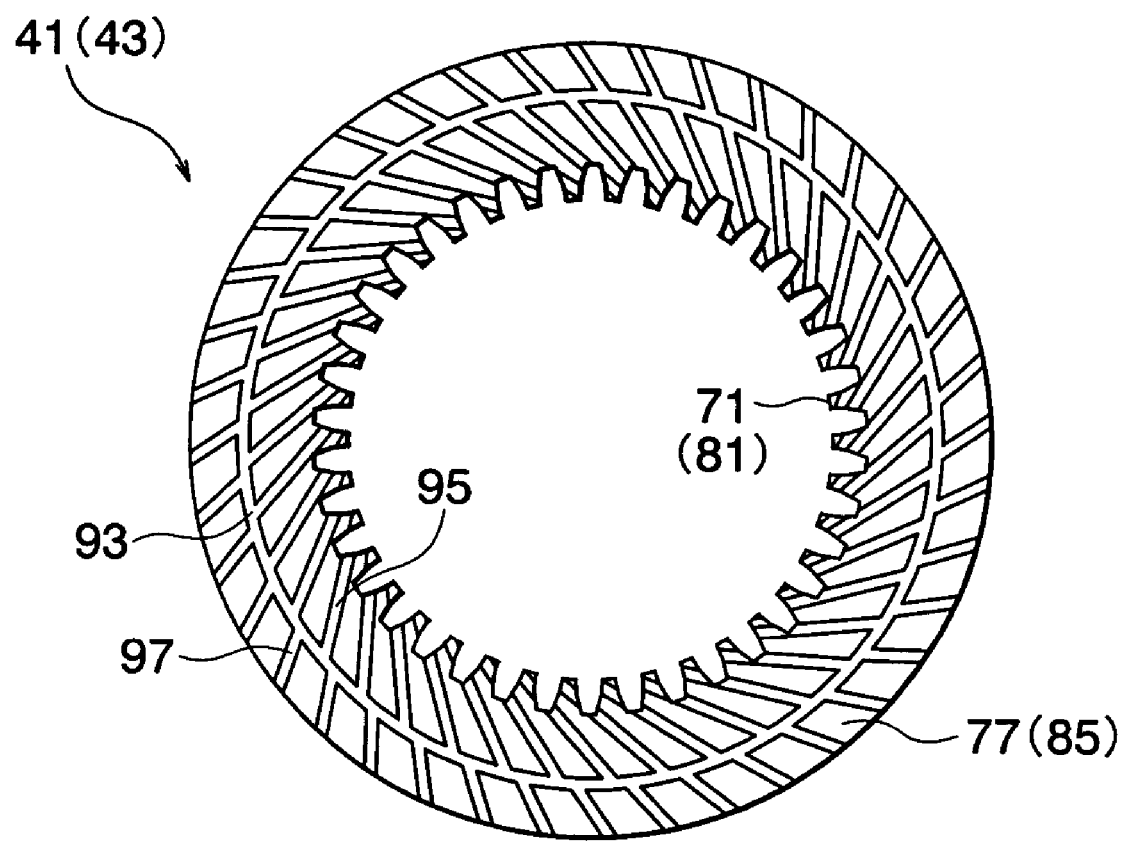
FIG. 14 is a view for showing facing surfaces of the internally splined friction plate and the internally splined separator plate according to the third embodiment.
Figure 15:
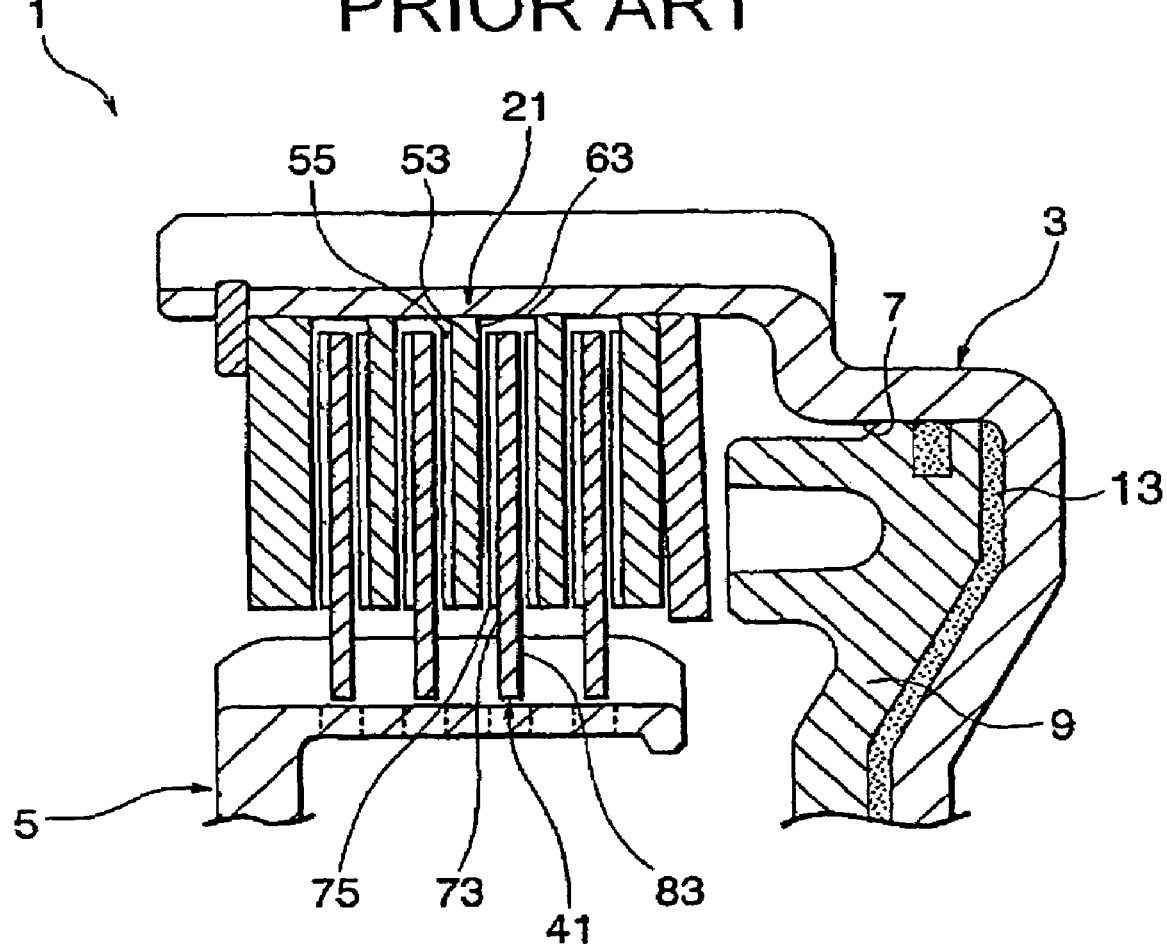
FIG. 15 is a longitudinally cross-sectional view of the essential part of a wet-type multiple disc clutch according to the prior art.

FIG. 13 is a view for showing the facing surfaces of the externally splined friction plate and the externally splined separator plate according to the third embodiment, while FIG. 14 is a view for showing the facing surfaces of the internally splined friction plate and the internally splined separator plate. As shown in these drawings, according to the third embodiment, on each of the facing surfaces 57, 65 of the externally splined friction plate 21 and the externally splined separator plate 23 and on the facing surfaces 77, 85 of the internally splined friction plate 41 and the internally splined separator plate 43, there are formed as the communication grooves an annular groove 93 formed between the inner periphery and the outer periphery, first slanting grooves 95 for communicating the inner periphery with the annular groove 93, and second slanting grooves 97 for communicating the annular groove 93 with the outer periphery. Note that when the members on the inner diameter side are rotated and the automatic transmission oil is supplied from the shaft core side, the both slanting grooves 95, 97 are slanting in the direction of rotation. On the other hand, the members on the inner diameter side are fixed, the both slanting grooves 95, 97 are slanting in an opposite direction to the direction of rotation. According to the third embodiment, since the above-described structure is employed, a pump effect occurs in the automatic transmission oil which passes through the annular grooves 93 and the both slanting grooves 95, 97. As a result, a flow amount of the automatic transmission oil is increased so as to enhance the cooling performance.

Specific explanation of the embodiments is as described above. However, the present invention is not limited to these embodiments. For example, in each of the embodiments, the present invention is applied to a wet-type multiple disc clutch of an automatic transmission for a car. However, the present invention may be applied to a wet-type multiple brake of an automatic transmission for a car, a wet-type multiple disc clutch of an automatic two-wheeled vehicle, and the like. The communication grooves may be formed on only either one of the friction plates and the separator plates, or they may not be provided if there arises no thermal problem. In addition, in the first and third embodiments, instead of the radial grooves or the slanting grooves, spiral grooves may be provided. Further, a specific structure of the wet-type multiple disc clutch as well as specific forms, or the like, of the friction plates and the separator plates can be properly changed within a range of the scope and spirit of the present invention.

What is claimed is:

1. A multiple disc clutch apparatus, comprising:
    a plurality of externally splined annular friction plates each having a friction material fixed to one side surface thereof only, and each being formed with engagement teeth at an outer peripheral portion thereof,
    a plurality of internally splined annular friction plates each having a friction material fixed to one side surface thereof only, and each being formed with engagement teeth at an inner peripheral portion thereof,
    wherein said externally splined friction plates and said internally splined friction plates are alternately arranged and are oriented such that their friction materials are not overlapped with each other,
    wherein a plurality of externally splined annular separator plates, each formed with engagement teeth on an outer peripheral portion thereof, are respectively interposed between said internally splined friction plates and said externally splined friction plates and
    wherein communication grooves for communicating an inner periphery with an outer periphery are formed on at least one of: (i) a surface of each externally splined friction plate facing a said externally splined separator plate, and (ii) a surface of each externally splined separator plate facing a said externally splined friction plate.

2. The multiple disc clutch apparatus according to claim 1, wherein said communication grooves are formed radially from said inner periphery toward said outer periphery.

3. The multiple disc clutch apparatus according to claim 1, wherein said communication grooves are formed in a net structure.

4. The multiple disc clutch apparatus according to claim 1, wherein said communication grooves comprise:
    an annular groove formed between said inner periphery and said outer periphery;
    first slanting grooves for communicating said inner periphery with said annular groove; and
    second slanting grooves for communicating said annular groove with said outer periphery.

5. A multiple disc clutch apparatus, comprising:
    a plurality of externally splined annular friction plates each having a friction material fixed to one side surface thereof only, and each being formed with engagement teeth at an outer peripheral p ortiori thereof,
    a plurality of internally splined annular friction plates each having a friction material fixed to one side surface thereof only, and each being formed with engagement teeth at an inner peripheral portion thereof,
    wherein said externally splined friction plates and said internally splined friction plates are alternately arranged and are oriented such that their friction materials are not overlapped with each other,
    wherein a plurality of internally splined annular separator plates, each formed with engagement teeth on an inner peripheral portion thereof, are respectively interposed between said externally splined friction plates and said internally splined friction plates and
    wherein communication grooves for communicating an inner periphery with an outer periphery are formed on at least one of: (i) a surface of each internally splined friction plate facing a said internally splined separator plate, and (ii) a surface of each internally splined separator plate facing a said internally splined friction plate.

6. The multiple disc clutch apparatus according to claim 5, wherein said communication grooves are formed radially from said inner periphery toward said outer periphery.

7. The multiple disc clutch apparatus according to claim 5, wherein said communication grooves are formed in a net structure.

8. The multiple disc clutch apparatus according to claim 5, wherein said communication grooves comprise:
    an annular groove formed between said inner periphery and said outer periphery;
    first slanting grooves for communicating said inner periphery with said annular groove; and second slanting grooves for communicating said annular groove with said outer periphery.

9. A multiple disc clutch apparatus, comprising:

a plurality of rotatable first engagement portions, each including an externally splined annular friction plate with only one side surface to which friction material is fixed for torque transmission, and each further including an externally splined annular separator plate adjacent to another side surface of said externally splined annular friction plate, and a plurality of second engagement portions, each including an internally splined annular friction plate with only one side surface to which friction material is fixed for torque transmission, wherein said first and second engagement portions are alternately arranged with said friction materials thereof facing a same direction.

10. A multiple disc clutch apparatus, comprising:

a plurality of first engagement portions, each including an externally splined annular friction plate with only one side surface to which friction material is fixed for torque transmission, and a plurality of rotatable second engagement portions, each including an internally splined annular friction plate with only one side surface to which friction material is fixed for torque transmission, and each further including an internally splined annular separator plate adjacent to another side surface of said internally splined annular friction plate, wherein said first and second engagement portions are alternately arranged with said friction materials thereof facing a same direction.

11. A multiple disc clutch apparatus, comprising:

a first engagement portion including an externally splined annular friction plate with only one side surface to which friction material is fixed for torque transmission, and a second engagement portion including an internally splined annular friction plate with only one side surface to which friction material is fixed for torque transmission, wherein one of said first and said second engagement portions is rotatable and includes an annular separator plate adjacent to another side surface of the respective annular friction plate of said one engagement portion, said annular separator plate being splined to rotate together with the respective annular friction plate, and wherein said annular friction plates of said first and second engagement portions are arranged with said friction materials thereof facing a same direction.

12. The multiple disc clutch apparatus according to claim 11, wherein each of said first and second engagement portions includes a respective said annular separator plate.

13. The multiple disc clutch apparatus according to claim 11, including a plurality of said first engagement portions.

14. The multiple disc clutch apparatus according to claim 11, including a plurality of said second engagement portions.

15. The multiple disc clutch apparatus according to claim 11, including a plurality of said first engagement portions and a plurality of said second engagement portions.

* * * * *